United States Patent [19]

Krueger et al.

[11] Patent Number: 5,059,374
[45] Date of Patent: Oct. 22, 1991

[54] METHOD FOR SEALING A HOLLOW FIBER MEMBRANE MODULE IN A CASE

[75] Inventors: Robert T. Krueger, Martinez; Terrence L. Caskey, Concord; Johnny L. Trimmer, Antioch; Janine L. Jorgensen, Clayton, all of Calif.

[73] Assignee: The Dow Chemical Company, Midland, Mich.

[21] Appl. No.: 450,933

[22] Filed: Dec. 14, 1989

Related U.S. Application Data

[63] Continuation-in-part of Ser. No. 309,756, Feb. 9, 1989, Pat. No. 4,929,259.

[51] Int. Cl.[5] .................. B28B 1/48; B01D 35/30
[52] U.S. Cl. .................. 204/156; 264/251; 264/254; 264/262; 264/263; 210/321.61; 210/321.8; 210/321.89; 210/450; 55/16; 55/158
[58] Field of Search .......... 210/321.61, 450, , 321.72, 210/321.77, 321.79, 321.8, 321.88, 321.89; 264/156, 251, 254, 262, 263; 55/16, 158

[56] References Cited

U.S. PATENT DOCUMENTS

| | | |
|---|---|---|
| 3,339,341 | 9/1967 | Maxwell et al. . |
| 3,422,008 | 1/1969 | McLain . |
| 3,616,928 | 11/1971 | Rosenblatt . |
| 3,698,560 | 10/1972 | Tapp et al. . |
| 3,760,949 | 9/1973 | Carey et al. .......... 210/450 |
| 3,832,830 | 9/1974 | Gerow . |
| 3,962,094 | 6/1976 | Davis et al. . |
| 4,036,616 | 7/1977 | Byrns . |
| 4,220,535 | 9/1980 | Leonard . |
| 4,231,879 | 11/1980 | Spranger . |
| 4,237,596 | 12/1980 | Hughes et al. . |
| 4,268,279 | 5/1981 | Shindo et al. . |
| 4,269,712 | 5/1981 | Hornby et al. . |
| 4,329,229 | 5/1982 | Bodnar et al. .......... 210/321.89 |
| 4,352,736 | 10/1982 | Ukai et al. . |
| 4,367,139 | 1/1983 | Graham . |
| 4,380,460 | 4/1983 | Otstot et al. . |
| 4,414,110 | 11/1983 | Geel et al. . |
| 4,512,892 | 4/1985 | Ganzi et al. . |
| 4,517,720 | 5/1985 | Otstot et al. . |
| 4,556,180 | 12/1985 | Manatt . |
| 4,565,630 | 1/1986 | Runkle . |
| 4,578,190 | 3/1986 | Fowler . |
| 4,666,469 | 5/1987 | Krueger et al. . |
| 4,666,543 | 5/1987 | Kawano .......... 156/169 |
| 4,670,145 | 6/1987 | Edwards . |
| 4,678,577 | 7/1987 | Thomas et al. .......... 264/251 |
| 4,686,039 | 8/1987 | Otstot et al. . |
| 4,689,255 | 8/1987 | Smoot et al. . |
| 4,707,267 | 11/1987 | Johnson . |
| 4,720,348 | 1/1988 | Savins . |
| 4,734,106 | 3/1988 | Gollan . |
| 4,746,430 | 5/1988 | Cooley . |
| 4,758,341 | 7/1988 | Banner . |
| 4,769,096 | 9/1988 | Vander Giessen et al. . |
| 4,770,778 | 9/1988 | Yokoyama et al. . |
| 4,781,834 | 11/1988 | Sekino et al. . |

FOREIGN PATENT DOCUMENTS

| | | |
|---|---|---|
| 0226431 | 6/1987 | European Pat. Off. . |
| 3409000 | 3/1983 | Fed. Rep. of Germany . |
| 54152681 | 5/1978 | Japan . |
| 53-31828 | 9/1978 | Japan . |
| 58-143805 | 2/1982 | Japan . |
| 61011110 | 6/1984 | Japan . |
| 6119273 | 11/1984 | Japan . |
| 2198430 | 6/1988 | United Kingdom . |

OTHER PUBLICATIONS

Antonson et al., "Analysis of Gas Separation by Permeation in Hollow Fibers," *Ind. Eng. Chem., Process Des. Dev.*, vol. 16, No. 4, 1977, pp. 463-469.

*Primary Examiner*—Michael W. Ball
*Assistant Examiner*—Francis J. Lorin

[57] ABSTRACT

Disclosed is a process for sealing a hollow fiber membrane separation module into a case. The hollow fiber mambrane separation module is formed from a plurality of hollow fibers arranged in a bundle surrounding a core and having tube sheets surrounding each end of the bundle which bind the hollow fibers together. The disclosed process simultaneous with such sealing creates first and second spaces overlying the ends of the plurality of hollow fibers. Such first and second spaces, in cooperation, permit the introduction and withdrawal of fluids through the lumens of the hollow fibers.

18 Claims, 4 Drawing Sheets

METHOD FOR SEALING A HOLLOW FIBER MEMBRANE MODULE IN A CASE

This Application is a continuation-in-part of U.S. patent application Ser. No. 309,756, filed Feb. 9, 1989; now U.S. Pat. No. 4,929,259.

BACKGROUND OF THE INVENTION

The present invention relates to a membrane separation device and method of manufacturing said device. The membrane separation device comprises a housing or case within which is fixedly situated a membrane separation module fabricated from a plurality of semipermeable hollow fiber membranes.

Separatory devices containing a hollow fiber membrane separation module useful for dialysis, microfiltration, ultrafiltration, reverse osmosis, blood oxygenation, gas separation, pervaporation, membrane stripping, and the like, are well known. Various methods of manufacture have been described. In general, however, the hollow fiber separation module consists of a plurality of fine hollow fibers whose end portions are potted in one or two active tubesheet(s) and whose open-fiber ends terminate in one or two active tubesheet face(s) which provides an access for fluid to enter or exit the interior of the hollow fibers, thereby forming a module comprising a bundle of hollow fibers and one or two tubesheets. The hollow fiber module is sealed in a housing or case in such a manner that two regions are defined by fluid flow which is controlled by the separatory or permeation properties of the hollow fiber membranes. The two regions are generally designated as the shellside and the tubeside. The shellside region is that region exterior to the hollow fibers which is between the tubesheets, while the tubeside region is that region on the interior of the hollow fibers. Each region may have fluid flowing through it, of higher or lower pressure than the other, depending on whether the feed fluid into the device is on the exterior or the interior of the hollow fibers. The driving force for transport through or across the hollow fibers may be due to a difference in pressure, concentration, and/or electrical potential.

The hollow fiber separation module may have one or two active tubesheets: in the former case the hollow fibers are doubled back so that all the ends of the hollow fibers terminate together in the one active tubesheet. A hollow fiber separation module possessing one such active tubesheet in which all hollow fiber ends terminate may also possess a non-active tubesheet to facilitate formation of the hollow fiber bundle and sealing the hollow fiber bundle within the housing or case. A non-active tubesheet does not contain the terminal ends of the hollow fibers. That is, fluid can not be introduced into or withdrawn from such a non-active tubesheet. The tubesheet(s) binds the hollow fibers together and holds them in place. Each tubesheet is also sealed to the inner wall surfaces of the housing or case, thus fixing the separatory module in place within the case. The tubesheet(s) together with the case define the shellside region external to the hollow fibers which does not communicate directly with the interior lumens of the hollow fibers.

Patents representative of the art of hollow fiber membrane separation devices include U.S. Pat. Nos. 2,972,349; 3,328,876; 3,228,877; 3,422,008; 3,423,491; 3,339,341; 3,403,515; and the like.

THE PRIOR ART

The prior art has disclosed the use of a number of resins to form the tubesheets. Typical of such resins are polyurethanes, polyolefins, wax-extended polyolefins, polyolefin copolymers, polyamides, polystyrene, polyvinyl chloride, silicone rubbers, epoxy resins, and the like.

A problem which has occurred in connection with the production of separation devices utilizing hollow fiber membrane separation modules is that there has been no inexpensive and convenient process for sealing the tubesheet(s) to the inner wall surfaces of the surrounding case which is suitable for large scale production. Because of heat, pressure, and other stress factors, the sealing means between the tubesheet(s) and the inner wall surfaces of the case may loosen or develop cracks, permitting intermingling of the fluids in the two aforementioned regions. This intermingling of fluids is unacceptable, as the efficient operation of such membrane separation devices requires that the fluids be substantially maintained in the aforementioned separate regions.

U.S. Pat. No. 4,269,712 discloses a hollow fiber medical separatory device which incorporates a pressure-type mechanical seal between the inner end surface of the disc portion of the tubesheet and a radially and axially inwardly extending tapering inner wall surface of the surrounding jacket of the device.

Sealing problems between the tubesheet(s) and container were overcome in U.S. Pat. No. 4,269,712 by providing a radially inwardly extending tapered section on the inner wall of the jacket or shell of the separatory unit, with the seal resulting from pressure urging the peripheral tubesheet wall axially inwardly to effect a liquid and gas-tight sealing of the tubesheet against a tapered shell, or jacket surface. The structure shown, however, is complex, and would be uneconomical to manufacture.

U.S. Pat. No. 4,414,110 discloses a hollow fiber medical separatory unit wherein the tubesheets at each end of the fibers have the shape of a frustum of a cone and are sized such that the fibers fill the cone to the peripheral edge at the outer end planar surface of the frustum. This device is also a complex one which would be difficult to manufacture economically.

U.S. Pat. No. 4,512,892 relates to an improved method and structure for sealing the ends of a tubular filter element wherein the method comprises providing a strip of non-porous film along the edge of a sheet of microporous filter material, the strip being joined to the filter material fluid-tight at its outer portion but forming a free-flap on its inner portion, forming the element with the strip at one end and over the upstream side of the filtered material, embedding the end in liquid sealer to a depth terminating over the flap portion of the strip, and solidifying the sealer. It is further stated that the free edges of a rectangular pleated membrane may be sealed to opposite walls of a containing support, the ends then being sealed as described.

All of the above means of sealing tubesheets to the inner wall surfaces of enclosing cases or containers have been found deficient in one aspect or another.

It would be an improvement in the art to provide a hollow fiber membrane separation device having simplified means for sealing the tubesheets and membrane module within the surrounding case.

In particular, it would be an improvement to provide an efficient, convenient, and economical process for sealing the membrane module with such associated tubesheets within a surrounding case which would substantially eliminate the possibility of breakage or loosening of the seal between the tubesheets and the case.

SUMMARY OF THE INVENTION

The invention relates to a process for sealing a hollow fiber membrane separation module into a case in which the hollow fiber membrane separation module comprises a plurality of hollow fibers arranged in a bundle surrounding a core and having tubesheets surrounding each end of the bundle which bind the hollow fibers together, the process comprising:

A. positioning the hollow fiber separation module within a case, while the case is in a substantially vertical position:

B. introducing a resin through an opening into the first end of the case in an amount sufficient to fill the region between the exterior of the first tubesheet and the interior of the case such that said resin encompasses a substantial portion of the first tubesheet:

C. curing the resin;

D. reversing the position of the case:

E. introducing a resin through an opening into the second end of the case in an amount sufficient to fill the region between the exterior of the second tubesheet and the interior of the case such that said resin encompasses a substantial portion of the second tubesheet:

F. curing the resin; and

G. providing openings at each end of the case through the cured resin, penetrating to the space overlying the ends of the hollow fibers, thereby providing flow paths for introducing and/or withdrawing fluids through said hollow fiber membrane separation modules.

The inventive process provides a convenient, effective, and economical process for sealing a hollow fiber membrane separation module within a case. Such a process is suitable for large scale production of such devices.

BRIEF DESCRIPTION OF THE DRAWINGS

FIGS. 2B and 3B are enlarged views of the opposite ends of an alternate embodiment of a hollow fiber membrane separation device of this invention adapted for use with a shellside sweep fluid.

DETAILED DESCRIPTION OF THE INVENTION

This invention relates a process for sealing within a case a hollow fiber membrane separation module. Such devices are useful for separating one or more fluids from one or more other fluids in a fluid mixture in which the separation is performed by selectively transporting one or more fluids across a membrane. In this invention, the membranes are in hollow fiber form. The fluid mixture to be separated may be introduced either on the outside of the hollow fiber membranes or down the bores or lumens of the hollow fiber membranes. The bore or lumen as used herein refers to the portion of the fiber which is hollow in the center of such fiber. Such devices are preferably adapted for feeding fluid down the bores of the hollow fiber membranes.

The hollow fiber membrane devices of this invention can be used to separate one or more fluids from one or more other fluids in a fluid mixture wherein the fluids possess different transport rates through or across the membranes. The fluids may be in gas, vapor, or liquid state.

In one preferred embodiment, the hollow fiber membrane devices of this invention are useful in separating one or more gases from one or more other gases in a feed gas mixture. The mixture of gases to be separated preferably comprises at least one of the gases selected from the group consisting of hydrogen, helium, oxygen, nitrogen, carbon monoxide, carbon dioxide, hydrogen sulfide, ammonia, methane, other light hydrocarbons, and the like. Light hydrocarbons as used herein means saturated and unsaturated $C_{1-4}$ hydrocarbons. Examples of such gases being separated are hydrogen and/or helium from light hydrocarbons, oxygen from nitrogen, nitrogen from methane, carbon monoxide and/or carbon dioxide from light hydrocarbons, and the like.

In another preferred embodiment, the fluids to be separated are liquids. In one preferred embodiment wherein the fluids to be separated are liquids, the material is transported through or across the membrane as a gas or vapor. The material permeating through or across the membrane as a gas or vapor may be removed from the device as a gas or vapor or condensed and removed from the device as a liquid. This separation may be referred to as membrane stripping, membrane distillation, or pervaporation. In membrane stripping, a microporous membrane is used and the material permeating through or across the membrane is removed from the device as a gas or vapor. In membrane distillation, a microporous membrane is used and the material permeating through or across the membrane is condensed and removed from the device as a liquid. In pervaporation, a non-microporous membrane is used and the material permeating through or across the membrane may be removed as a gas or vapor or condensed and removed from the device as a liquid. In these embodiments, volatile compounds, that is, those with relatively higher vapor pressures under the separation conditions, are separated from compounds with relatively lower vapor pressures. Examples of volatile compounds which may be removed from liquid mixtures include $C_{1-10}$ aliphatic and aromatic halogenated hydrocarbons such as dichloromethane (methylene chloride), dibromomethane (methylene bromide), trichloromethane (chloroform), tribromomethane (bromoform), carbon tetrachloride, 1,1-dichloroethane, 1,2-dichloroethane, 1,1,1-trichloroethane, 1,1,2-trichloroethane, trichloroethylene, tetrachloroethylene (perchloroethylene), 1,2-dichloropropane, chlorobenzene, dichlorobenzene, trichlorou benzene, and hexachlorobenzene; $C_{1-10}$ aliphatic and aromatic hydrocarbons such as methane, ethane, propane, butane, hexane, heptane, octane, ethylene, propylene, butylene, benzene, toluene, and xylene; $C_{1-10}$ aliphatic and aromatic alcohols such as methanol, ethanol, propanol, butanol, pentanol, hexanol, and phenol; $C_{1-8}$ ketones such as acetone, methylethylketone, methylisobutylketone, pentanone, and hexanone; $C_{1-8}$ ethers such as bis(2-chloroethyl)ether: $C_{1-8}$ amines such as methylamine, dimethylamine, trimethylamine, ethylamine, diethylamine, triethylamine, ethylenediamine, and aniline; and the like. Less volatile liquids from which the volatile compounds may be removed include water and mixtures of water and organics. In another preferred embodiment, gases entrained or dissolved in a liquid may be removed from such liquids. Examples of such entrained or dissolved gases include oxygen, carbon monoxide, carbon dioxide, sulfur dioxide, hydrogen sulfide, ammonia, and the like.

The hollow fiber membranes are arranged in a bundle which comprises a plurality of the hollow fiber membrane. Such a bundle may take various shapes and possess various fiber wrapping patterns. Bundles of hollow fiber membranes useful in this invention may comprise various shapes and fiber arrangements, including those disclosed in Mahon, U.S. Pat. No. 3,228,876 and McLain, U.S. Pat. No. 3,422.008, the relevant portions of each patent incorporated herein by reference for all legal purposes which may be served thereby. Preferably, the bundle is arranged in an organized, that is, substantially non-random, fashion. In one preferred embodiment, the hollow fiber membrane bundle is arranged in a cylindrical fashion with the ends of the hollow fibers located at each end of the cylindrical bundle. Such a bundle is preferably an elongated bundle with the length being greater than the diameter. Preferably, the hollow fibers in the bundle are arranged in either a parallel wrap fashion or in a bias wrap fashion. In parallel wrapping, the hollow fibers lie substantially parallel to one another with each end of the hollow fibers found at each end of the bundle. In bias wrapping, the hollow fibers are wrapped in a crisscross pattern at a set angle, thus holding the hollow fibers in place in a bundle. In the bias wrap pattern, the ends of the hollow fibers are located at the end of the bundle. Permeable cloth wraps such as DYNEL polyester cloth may be used to help hold the bundle of hollow fibers together.

The hollow fiber membranes are generally formed from a polymeric material which is capable of separating one or more fluids from one or more other fluids in a fluid mixture. The polymeric materials which may be used to prepare the hollow fiber membranes preferably include olefinic polymers, such as poly-4-methylpentene, polyethylene, and polypropylene; polytetrafluoroethylene; cellulosic esters, cellulose ethers, and regenerated cellulose: polyamides; polyetherketones and polyetheretherketones: polyestercarbonates: polycarbonates, including ring substituted versions of bisphenol based polycarbonates: polystyrenes: polysulfones; polyimides; polyethersulfone; polyesters: and the like. The hollow fiber membranes may be homogeneous, symmetric (isotropic), asymmetric (anisotropic), or composite membranes. The membranes may have a dense discriminating region which separates one or more fluids from one or more other fluids based on differences in solubility and diffusivity of the fluids in the dense region of the membrane. Alternatively, the membranes may be microporous and separate one or more fluids from one or more other fluids based on relative volatilities of the fluids.

Hollow fiber membranes with dense regions are preferred for gas separations. Asymmetric hollow fiber membranes may have the discriminating region either on the outside of the hollow fiber, at the inside (lumen surface) of the hollow fiber, or located somewhere internal to both outside and inside hollow fiber membrane surfaces. In the embodiment where the discriminating region of the hollow fiber membrane is internal to both hollow fiber membrane surfaces, the inside (lumen) surface and the outside surface of the hollow fiber membrane are porous, yet the membrane demonstrates the ability to separate gases. In the embodiment wherein gases are separated, the preferred polymeric materials for membranes include polyester-carbonate, polysulfone, polyethersulfone, polyimide, polyester, and polycarbonate. More preferred polymeric materials for gas separation membranes include polycarbonate and polyesteroarbonate. In one preferred embodiment, such membranes are prepared by the process described in U.S. Pat. 4,772,392, the relevant portions incorporated herein by reference for all legal purposes which may be served thereby.

Microporous membranes are preferred for liquid separations such as membrane stripping and membrane distillation. Such microporous membranes may be symmetric (isotropic) or asymmetric (anisotropic). In the embodiment wherein liquids are separated, preferred polymeric materials for membranes include polyolefins or fluorinated polyolefins, such as polyethylene, polypropylene, poly-4-methylpentene, fluorinated polyethylene, polytetrafluoroethylene, and copolymers and blends thereof, polystyrene, polyetherketone, and polyetheretherketone. The methods for preparing such hollow fiber membranes are well known in the art.

The hollow fibers preferably possess an outside diameter of between about 50 and about 5,000 microns, more preferably of between about 100 and about 1,000 microns, with a wall thickness of between about 5 and about 500 microns, more preferably between about 10 and about 100 microns.

About each end of the bundle is a tubesheet. The tubesheet functions to hold the hollow fiber membranes in place and to separate the membrane device into three different fluid regions. Such fluid regions include a first fluid region external to the first tubesheet, which in the preferred embodiment utilizing boreside feed comprises a feed inlet region wherein the mixture of fluids to be separated is introduced into the hollow fiber membranes. The second fluid region is the region between the tubesheets which is external to the hollow fiber membranes, that is, the shellside (outside) of the hollow fiber membranes. The third fluid region is external to the second tubesheet, which in the preferred embodiment utilizing boreside feed comprises the non-permeate outlet region into which the fluid flowing down the bores of the hollow fiber membranes which does not permeate across the membranes flows and from which such fluid is removed.

The tubesheets may be comprised of a thermoset or thermoplastic resinous material. Such resinous material should be capable of forming a fluid tight seal around the hollow fiber membranes. In some embodiments, it is preferable that such resinous material also be capable of bonding to the core and/or case as well as the hollow fiber membranes. The hollow fiber membranes in the bundle communicate through each tubesheet, and the face of each tubesheet opposite the bundle is opened such that the bores of the hollow fiber membranes are opened to the region adjacent to each face, thereby allowing communication of fluid from such regions into and out of said hollow fiber membranes. The majority of each tubesheet comprises a composite of the hollow fiber membranes embedded in the resinous material. The tubesheets may be any shape which performs the functions hereinbefore described. Preferably, the tubesheets are circular with sufficient cross-sectional area and thickness to provide support for the hollow fiber membranes and to withstand the pressures exerted on the tubesheets during operation. The portion of each tubesheet outside of the bundle may be built up for various purposes depending upon the design of the device. These portions of the tubesheets may comprise solely resin or resin impregnated cloth which is wrapped around the outer portion of each tubesheet.

Examples of such materials useful as resinous materials for tubesheets include artificial and natural rubbers, phenolaldehydes, acrylic resins, polysiloxanes, polyurethanes, fluorocarbons, and epoxy resins.

In the embodiment where the device is used for gas separations, the tubesheets are preferably prepared from epoxy resins. Any epoxy resin which adheres to the hollow fiber membranes and provides stability to a hollow fiber membrane device once cured can be used in this invention. Polyepoxide resins which are desirable for the resin formulations useful in this invention include glycidyl polyethers of polyhydric phenols.

Illustrative of the poyhydric phenols are mononuclear phenols and polynuclear phenols, and included within the latter are the phenolaldehyde condensation resins commonly known as novolac resins. Typical mononuclear phenols include resorcinol, catechol, hydroquinone, phloroglucinol and the like. Examples of polynuclear phenols include 2,2 bis(4-hydroxyphenyl)propane(bisphenol A), 4,4'-dihydroxybenzophenone, 1,1-bis(4-hydroxyphenyl)ethane, bis(2-hydroxynaphthyl)methane, 2,2-bis(4-hydroxyphenyl)butane, 4,4'-dihydroxyphenyl phenyl sulfone, and the like.

The preparation of such epoxy resins is well known and is described in a number of patents such as U.S. Pat. No. 2,935,488 and in textbooks such as Lee and Neville, *Handbook of Epoxy Resins*, McGraw-Hill Book Co., 1967, both incorporated herein by reference.

Preferred epoxy resins are those resins derived from bisphenol A, e.g., diglycidyl ethers of bisphenol A. Such preferred resins generally correspond to the formula:

phenylsulfone, 4-chlorophenylene diamine, and the like. Curing agents preferred for use in this invention include Ancamine® amine curing agents, available from Pacific Anchor Chemical Corp.

An optional third component of the tubesheet epoxy resin formulation is an epoxy curing catalyst. Any known epoxy curing catalyst which enhances the curing of a polyglycidyl ether of a polyhydric phenol with the curing agent may be used. Such catalysts are generally used in catalytic amounts, that is, amounts sufficient to enhance the curing of the epoxy resin with the curing agent. Preferably, the catalyst is present in an amount of between about 0.5 and 10 parts per hundred of resin, more preferably between about 0.5 and 4 parts of catalyst per hundred parts of resin, and most preferably between about 1 and 2 parts per hundred parts of resin. Preferred catalysts include tertiary amines, for example, benzyldimethylamine, N,N,N',N'-tetramethylbutanediamine, dimethylaminopropylamine, N-methylmorpholine, N-triethylenediamine, and the like. Generally, where the curing agent is amine based, a catalyst is not necessary.

In the embodiment wherein the device of the invention is used for membrane stripping, membrane distillation, or pervaporation, the tubesheets preferably comprise the epoxy resins hereinbefore described or polyurethanes.

The hollow fiber membrane bundle is arranged about a core; the core is arranged such that it extends through and is bonded to both the first and second tubesheets. The core functions to provide support for the two tubesheets and keeps the tubesheets from collapsing upon one another during operation. The core further functions to support the hollow fiber membrane bundle which is arranged about the core. The core may comprise a rod, a solid tube, or a perforated tube, provided the core possesses sufficient mechanical strength to support the hollow fiber membranes and the tubesheets. The core may possess a non-circular cross-section. In one embodiment where no sweep fluid is used, it is preferred that the core either be a solid tube or a solid rod. In another embodiment where no sweep fluid is used, it is preferred that the core be a hollow tube which may serve to return non-permeate fluid from the third fluid region adjacent to the second tubesheet to wherein n is a positive real number of between about zero and 6, more preferably between about zero and 4, more preferably between about zero and 1.5. In the discussion hereinafter, all parts with respect to the resin formulations will be based on 100 parts by weight of the epoxy resin (parts per hundred parts of resin, phr).

Epoxy resins preferred for use in this invention include D.E.R. ® epoxy resins, available from The Dow Chemical Company.

The epoxy resin is cured with a curing agent known to those skilled in the art. Preferred curing agents include polyfunctional amines, e.g., aromatic diamines, or mixtures or adducts thereof, and 2,4-dialkylimidazoles. Typical amines include m-phenylenediamine, methylenedianiline, mixtures (including adducts) of m-phenylenediamine and methylenedianiline, diaminodithe feed end of the module. That is, the non-permeate fluid exiting the hollow fibers in the vicinity of the second tubesheet may be returned to the vicinity of the first tubesheet via the core adapted therefore.

In some embodiments utilizing boreside feed, it is desirable to introduce a sweep fluid into the shellside of the hollow fiber membrane device in order to aid in the removal of permeated fluids from the vicinity of the second fluid region on the outside of the hollow fiber membranes between the two tubesheets. One method of introducing such a sweep fluid is to equip one end of the core with a sweep inlet means, adapted for introducing a sweep fluid into the core. In this embodiment, the core is perforated in the vicinity of the hollow fiber membrane bundle such that the sweep fluid enters the hollow fiber membrane bundle. The core tube is preferably solid where it passes through the first fluid feed inlet region and third fluid nonpermeate outlet region. In another preferred embodiment where a sweep fluid is used, the core is perforated at one end of the portion of the core located between the tubesheets. In one such preferred embodiment, such end of the core is adjacent to the second tubesheet, opposite the first fluid feed inlet region, which aids in promoting countercurrent flow.

The core may be made of any material which possesses sufficient mechanical strength to provide the desired support for the bundle and tubesheets. The core may be comprised of a plastic such as PVC, a composite material, or a metal. Preferably, the core is comprised of a metal, for example, aluminum or steel.

The entire membrane module is placed within a case. The case functions to protect the outside of the membrane module from damage and to contain or seal the membrane module from the outside environment. Further, the case is arranged about the tubesheets in such a fashion that a seal is formed between the first tubesheet and the case and the second tubesheet and the case, such that fluid cannot communicate across or through the seal. Thus the membrane device is divided into three distinct non-communicating regions: a first fluid region exterior to the first tubesheet, in the embodiment utilizing boreside feed comprising the feed inlet region; a second fluid region being the region between the tubesheets which is outside of the hollow fiber membranes: and a third fluid region exterior to the second tubesheet, in the embodiment utilizing boreside feed comprising the non-permeate outlet region. The seal is formed by any means which provides a fluid tight seal between each of the tubesheets and the case. In a preferred embodiment, the tubesheets may be bonded directly to the case with an adhesive material which bonds to both the tubesheet and the case. In another preferred embodiment, the case contains a lip or taper, against which a gasket is optionally placed, and against which the outer circumference of the tubesheet face adjacent to the gasket seals under the influence of the hydrostatic pressure applied during operation of the device, the void space between the tubesheet and the case being filled with resin.

The case may comprise any material which is capable of protecting the membrane device from the environment. In the embodiment utilizing boreside feed, the case may, but need not be, a pressure vessel. In those embodiments utilizing boreside feed wherein it is desirable to collect the permeate fluid within the case, the case should be substantially impermeable to the permeate fluid. Preferably, the casing material is a plastic such PVC, a composite, or a metal. More preferably, the case material is metal, such as aluminum or steel.

At the outside face of each tubesheet is positioned a protective tubesheet cap, to form regions adjacent to the opposite faces of the tubesheets which are opened to the hollow fiber membranes. The region adjacent to the outside face of the first tubesheet, in part defined by the protective cap positioned thereupon, is the first fluid region. The region adjacent to the outside face of the second tubesheet, in part defined by the protective cap positioned thereupon, is the third fluid region. End caps are attached in place over the protective tubesheet caps. In a preferred embodiment, the end capping means is an endplate which is attached by an attachment means to the case. Such endplate may be attached by providing a method of bolting the endplate directly onto the case. The case may have arranged about it or bonded to it an attachment means adapted for attaching the end capping means to the end of the case. Each end of the case may have arranged around its outside a flange to which the end capping means may be fastened. In one embodiment, the flange may be formed by building up the tubesheet. In another embodiment, a separate flange may be bonded about the tubesheet, the case, or both the tubesheet and the case. In another embodiment, a slip flange may be placed about the case. In such an embodiment, the tubesheet is built up such that the slip flange is held on the membrane device. The end capping means is affixed to the flange which is held on the device by the built up tubesheet. In another embodiment, the end capping means may be welded or soldered to the case. In another embodiment, one of the end capping means may comprise an integral portion of the case.

The membrane devices of this invention further comprise a feed inlet means. Generally, this is a port, nozzle, fitting, or other opening which allows introduction of the mixture of fluids to be separated into the device. In a boreside feed device, the feed inlet means is located at one end of the device such that the feed may be introduced into the bores of the hollow fiber membranes. Such feed inlet means is located in the vicinity of the opposite (outside) face of the first tubesheet. Preferably, the device is designed such that there is a first fluid region or cavity, that is, the feed inlet region, i.e., a region overlying the hollow fibers, which is sealed to prevent fluid communication with the outside of the membrane device within the case or with the region between the tubesheets which is outside the hollow fiber membranes. The inlet feed region is defined by the first tubesheet and the protective tubesheet cap. Such feed inlet region functions as a pressure vessel. The feed inlet means introduces the feed fluid mixture into such region. Such region communicates with one end of the hollow fiber membranes, thus allowing the feed fluid mixture to be separated to flow into and down the bores of the hollow fiber membranes. The feed inlet means may be located in the first end capping means. In a shellside feed device, the feed inlet means is located in the vicinity of the second fluid region external to the hollow fibers between the tubesheets. In such an embodiment, the feed inlet means is preferably located within the case.

The non-permeate outlet means is adapted for removing the fluids which do not permeate through the hollow fiber membranes from the membrane device. In a boreside feed device, the fluids which do not permeate through the membranes exit the bores of the hollow fiber membranes at the end opposite that end to which the feed fluid mixture is introduced. Preferably, the exiting fluids enter a third fluid region, that is, the non-permeate outlet region i.e., a region overlying the hollow fibers. Such region is adjacent to the opposite (outside) face of the second tubesheet and is sealed such that fluid cannot communicate with the outside of the membrane device within the case or with the region between the tubesheets which is outside the hollow fiber membranes. This region is generally a cavity defined by the second tubesheet and the protective tubesheet cap. The non-permeate outlet means generally is a port, nozzle, fitting, or other opening which allows removal of the non-permeate from the device. The non-permeate outlet means may be located in the second end capping means. In a shellside feed device, the non-permeate outlet means is located within the vicinity of the second fluid region, preferably within the case.

In a boreside feed device, the permeate outlet means for removing the fluids which permeate through the hollow fiber membranes from the region between the two tubesheets which is outside of the hollow fiber membranes is a port, nozzle, fitting, or other opening adapted for withdrawing the permeate from the shellside of the membrane device. In one embodiment, it is preferable that the permeate outlet means be located near the end of the membrane device to which the feed fluid mixture is introduced. Such location of the permeate outlet means results in countercurrent flow of the feed fluid mixture with relationship to the flow of the permeate fluid, which enhances the concentration gradient along the hollow fiber membranes, thereby improving the recovery and productivity of the membrane device. In a shellside feed device, the permeate outlet means is located in the vicinity of the first fluid region and/or the third fluid region exterior to the first and second tubesheets, respectively. Such permeate outlet means are preferably located in the end capping means.

In the embodiment utilizing boreside feed, the membrane devices of this invention optionally contain means for channeling flow; such optional means for channeling flow are arranged to channel flow of permeate in a longitudinal direction parallel to the core towards the permeate outlet means. The optional means for channeling flow thus function to encourage countercurrent flow of the feed fluid mixture to be separated down the bores of the hollow fibers with relation to the flow of the permeate fluid and the sweep fluid, if any.

Such membrane devices of this invention may contain one or more optional means for channeling flow of permeate. Preferably, one means for channeling flow encircles the exterior of the hollow fiber bundle and has its first end attached to, or embedded in, the second tubesheet such that the permeate fluid cannot exit the device near the second tubesheet: the second end of said exterior means for channeling flow is located a distance from the first tubesheet, wherein the distance between the second end of the means for channeling flow and the first tubesheet is sufficient to withdraw the permeate fluid and sweep fluid, if any, through the permeate outlet means wherein such flow occurs near the first tubesheet.

In another embodiment, one optional means of channeling flow may be embedded in both tubesheets. In such an embodiment, some means of allowing the flow of permeate fluid from the outside of the hollow fiber bundle to exit the device via the permeate outlet means is incorporated in the means for channeling flow. Preferably, the means for allowing the flow of fluid to the permeate outlet means in such an embodiment are holes or perforations in the flow channeling means. Such holes or perforations are located near the end embedded in the first tubesheet.

One or more optional means for channeling flow may be located within the interior of the hollow fiber bundle. The first end of such interior means for channeling flow is located near the second tubesheet such that the distance between the second tubesheet and the interior means of channeling flow is sufficient to allow the permeate fluid and sweep fluid, if any, to flow into the flow channels created by the interior means for channeling flow. The second end of such interior means for channeling flow is located near the first tubesheet wherein the distance between the second end and the first tubesheet is sufficient to withdraw the permeate stream and sweep fluid, if any, through the permeate outlet means. Such interior means of channeling flow function to maintain countercurrent flow throughout the device and to control permeate concentration within the device. In the embodiment where no sweep fluid is used, such interior optional means for channeling flow preferably have a first end embedded in the second tubesheet and the second end located at a distance from the first tubesheet, said distance between the end of the interior means for channeling the flow and the first tubesheet being sufficient to withdraw the permeate fluid flowing along the interior means for channeling flow through the permeate outlet means. Such interior optional means for channeling flow functions to force the permeate fluid to flow in a direction countercurrent to the direction that the feed fluid mixture is flowing down the bore of the hollow fiber membranes. Such countercurrent flow results in reducing the concentration of the permeate fluid in the region nearest the second tubesheet, thus maximizing the concentration gradient across a major portion of the length of the membrane device.

In the embodiment wherein a sweep fluid is introduced into the hollow fiber bundle via the core, it is preferable to have at least two means for channeling flow of permeate.

The actual distance between the end of the means for channeling flow and the first tubesheet is not critical, provided sufficient space is provided between the end of the means for channeling flow and the tubesheets to allow the permeating gas to be withdrawn by the permeate outlet means. This results in an improved recovery and productivity for the device utilizing boreside feed.

The means for channeling flow may, in one preferred embodiment, comprise a series of substantially impermeable baffles or wraps. Such baffles are preferably comprised of flexible materials which are substantially impermeable to the fluids being separated. Examples of suitable impermeable baffle materials are MYLAR polyester film available from ICI and SARAN polyvinylidene chloride plastic film available from The Dow Chemical Company. Such baffles may be arranged as concentric tubes parallel to the core. Optionally, such baffles may be formed in a spiral fashion beginning at the core and ending near or at the outside of the bundle. The number of baffles which may be present is that number which provides sufficient channeling of the permeate fluid to maintain a substantially countercurrent flow. The number of baffles used will therefore depend upon the bundle diameter, the packing factor of the hollow fiber membranes in the bundle, and the bundle length. In one preferred embodiment, baffles are preferably placed in intervals measured along the bundle diameter from the core of between about $\frac{1}{4}$ to about 2 inches, more preferably about $\frac{3}{4}$ to about 1 $\frac{1}{2}$ inches, even more preferably about $\frac{3}{4}$ to 1 $\frac{1}{4}$. The baffle length should be sufficient to promote countercurrent flow along a major portion of the length of the hollow fiber membranes. The baffles preferably extend along the length of the bundle between the tubesheets between about 50 and about 95 percent, more preferably between about 75 and about 95 percent, even more preferably between about 80 and about 90 percent.

Optionally, the device may contain a separate tubesheet support means comprising a means which functions to support the outer edge of the tubesheets and to prevent or reduce stresses due to bending and compression as a result of pressurizing the outside faces of the tubesheets. The tubesheet support means is preferably a cylinder which surrounds the outer portion of the hollow fiber bundle and is bonded about the tubesheet with a resin. Any resin which adheres the tubesheet to the tubesheet support and has sufficient modulus to maintain the bond under normal operating conditions is useful for forming such a bond. Included in the resins which may be used to form such a bond are the resins which may be used to form the tubesheets. The support means may surround a portion of the tubesheet and be bonded thereto or the support means may be embedded in a tubesheet which is built up around the support means. The tubesheet support means may be made of any material which provides sufficient support to prevent or reduce the compression stresses and bending stresses on the tubesheet and to prevent the tubesheets from collapsing in on one another. Such materials include high strength plastics such as PVC, composites, and metals: metals are preferred. Examples of metals which may be used include aluminum or steel. The tubesheet support means contains one or more ports or openings so as to allow the permeate fluid to leave the membrane device.

Optionally, a material which functions to insulate the membrane device and/or absorb shock may be placed within the case on the outside of the hollow fiber bundle in the region between the two tubesheets. Such a material includes polyurethane foam and tightly packed foam beads. The material generally covers a portion of the outside of the hollow fiber membrane bundle, said portion extending from the second tubesheet along the length of the hollow fiber membrane bundle towards the first tubesheet and ending short of the first tubesheet such that a sufficient opening exists to allow the permeate fluid and sweep fluid, if any, to flow through the opening to the permeate outlet means. In a preferred embodiment, the insulating and/or shock absorbing material also functions as the exterior means for channeling flow.

The hollow fiber membrane bundles of this invention may be constructed using processes well known in the art. Generally, in hollow fiber membrane bundle fabrication, the hollow fiber membranes are formed into a bundle with a suitable shape for device construction. Preferred bundle arrangements include parallel laying down of fibers or bias wrap laying down of fibers. The tubesheets may be formed about the ends of the bundle simultaneously with laying down of the fibers, such as by dripping resin along the fibers as the fibers are laid down. Alternatively, the bundle may be formed and then the tubesheets may be formed about each end of the bundle by centrifugal casting or dunk potting techniques, as well known in the art. In those embodiments where it is desirable to build up the tubesheets to a circumference larger than the circumference of the hollow fiber bundle, the following procedure may be used. Where the tubesheets are formed after the formation of the bundle, the casting or potting technique involves using appropriate molds to form larger circumference tubesheets. In the embodiment where the tubesheet is formed as the fibers are being laid down, once all the fibers have been laid down, the tubesheets may be built up by a variety of methods. One such method is to continue to wrap resin and impregnated cloth around the end of the tubesheets or circumference of the tubesheets and provide further resin so that the tubesheets are built up; thereafter, the resin is cured.

The optional means of channeling flow, that is, preferably the baffles are introduced into the hollow fiber bundle during fabrication of the bundle. If the baffles are placed in spiral or jelly roll configuration, the baffles are placed around the fibers as the fibers are laid down. Alternatively, if the baffles are of a concentric cylinder arrangement, then after a portion of the fibers are laid down, a baffle is placed over the fibers, and further fiber layers are laid down until the next baffle is placed over the fibers: this procedure is continued until the device is completed.

Once the hollow fiber bundle, tubesheets, and baffles have been assembled, then the optional tubesheet support means is placed about the outside of the hollow fiber bundle and either bound to the tubesheet using a resin, or the tubesheet is built up around the end of the tubesheet support means. In one embodiment where the tubesheet support means is bonded to the tubesheet, the following procedure is used. With the tubesheet support means on end, the tubesheets and hollow fiber bundle is inserted into the tubesheet support means, the tubesheet on one end of having been previously built up and machined to provide a shoulder against which the tubesheet support means is seated on said end. The tubesheet is then optionally built up around the tubesheet support prior to sealing the module within the case as hereinafter described.

The tubesheets may be potted and placed inside of the tubesheet support means, forming the tubesheet and the bond between the tubesheet and the tubesheet support means in a single step. Once the tubesheet support means is bonded to the tubesheet, then an attachment means is bonded to the tubesheet support means, the tubesheet, or both, which is adapted for attaching the end capping means thereto. In one embodiment, a flange is welded to the tubesheet support means or bonded to the tubesheet via a resin, or both. Thereafter, the end capping means are attached to such a flange. Where necessary, gaskets are placed between the flange about the tubesheet and the end capping means so as to insure a fluid tight seal. Alternatively, slip flanges may be used as described hereinbefore.

To seal the hollow fiber membrane module within the case, the case with a protective tubesheet cap and one end capping means in place is first obtained and is positioned in a substantially vertical position. The hollow fiber membrane separation module which has been prefabricated as hereinbefore described is then positioned within the case and held in a substantially fixed position by suitable means. Thereafter, a resin is injected through an opening at the bottom of the case or lower end cap, into the interior region between the interior wall surface of the case, and the exterior surface of the tubesheet not covered by the protective tubesheet cap, and the protective tubesheet cap, the resin being injected in an amount sufficient to substantially fill the region in the case such that said resin encompasses a substantial portion of the tubesheet.

The resin is then allowed to cure. Thereafter, the case position is reversed, and the process repeated. That is, that portion of the case which was originally at the top, is now positioned at the bottom, and a resin is injected through an opening at the now bottom of the case or end cap into the interior region between the interior wall surface of the case, the exterior surface of the tubesheet not covered by the protective tubesheet cap, and the protective tubesheet cap the resin being injected, in an amount sufficient to substantially fill the region in the case such that said resin encompasses a substantial portion of the tubesheet. Thereafter, the resin is allowed to cure.

After the resin at both ends of the device has cured, an opening is made such as by drilling through at least one of the openings through which the resin was originally injected, so that communication may be obtained from the exterior of the case to the interior region overlying the faces of the hollow fibers through which fluid may be introduced or withdrawn.

The process of the invention is further illustrated by reference to FIGS. 1-4: the hollow fibers are not shown for simplicity. Referring to FIG. 2, the hollow fiber bundle 10 containing optional baffles 11 is formed with tubesheets 14 and 15 about a core 12 containing a plug 26, thus comprising a hollow fiber membrane module. The hollow fiber membrane module with protective tubesheet caps 19 and 20 is inserted vertically into case 16 containing an integral end cap 18 in which is located an opening 22, such that the end of the hollow fiber bundle comprising tubesheet 15 and protective tubesheet cap 20 are located at the bottom of the vertically situated case 16. Protective tubesheet caps 19 and 20, in conjuction with tubesheets 14 and 15, respectively, serve to define regions 27 and 29 overlying the hollow fibers. Resin is injected into the region formed between the interior surface of the case 16 and the exterior surfaces of the protective tubesheet cap 20 and tubesheet 15. After the resin cures, the position of the case 16 is reversed, and the procedure may be repeated. End cap 17 is attached in place via bolts 24 over protective tubesheet cap 19. End cap 17 contains an opening 21 into which resin is injected. Openings 21 and 22, filled with resin, are drilled through and into protective tubesheet caps 19 and 20 to permit fluid to be introduced or withdrawn therethrough.

Figure 1:
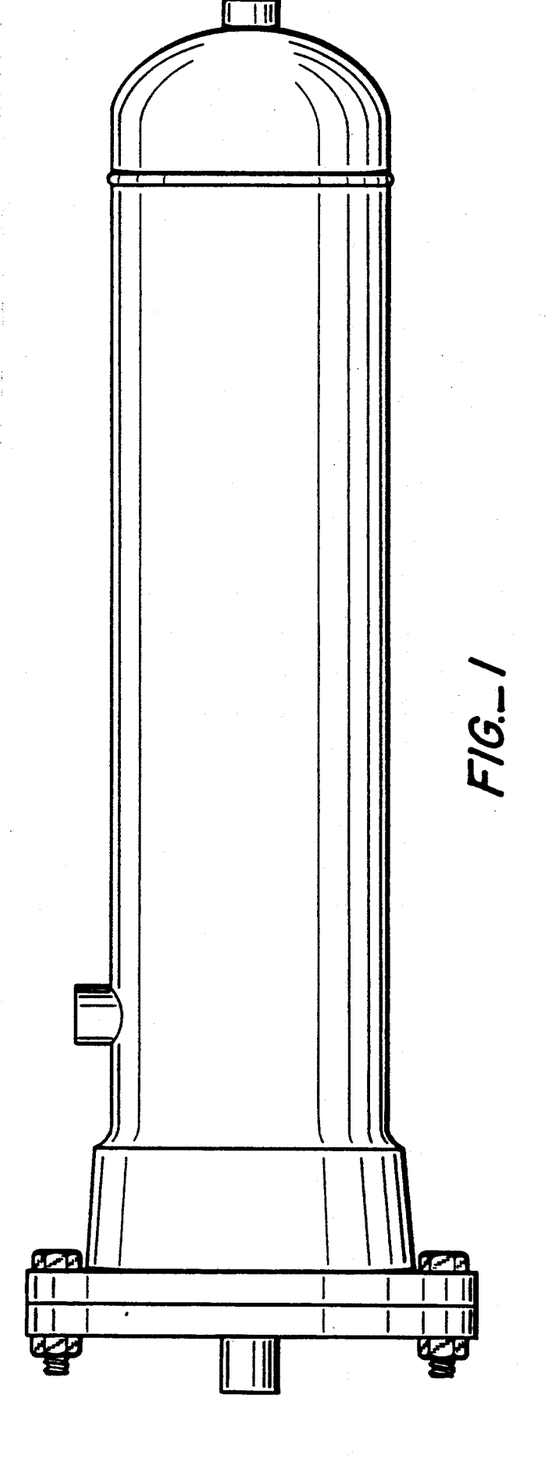
FIG. 1 is a side view of a hollow fiber membrane separation module forming a part of the membrane separation device of this invention.
Figure 2:
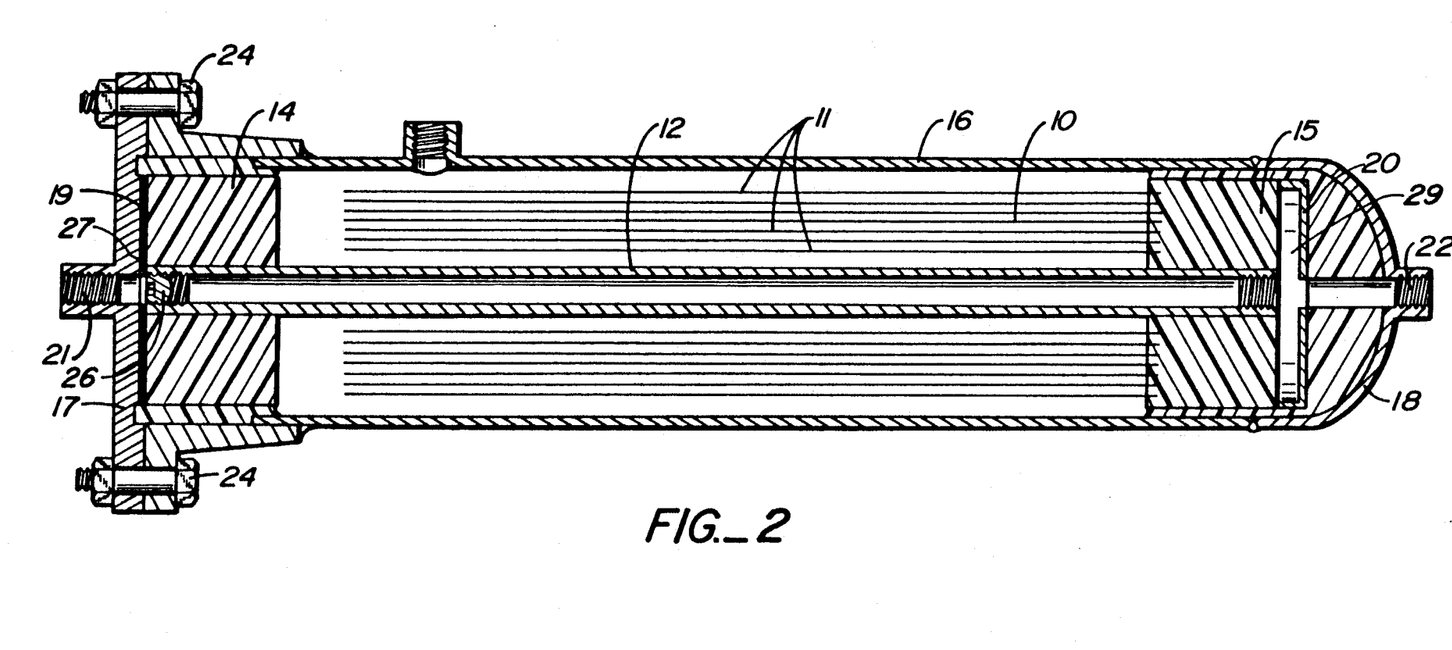
FIG. 2 is a sagittal partially sectioned view taken along the plane of the paper hollow fiber membrane separation device of FIG. 1 which contains baffles.
Figure 3A:
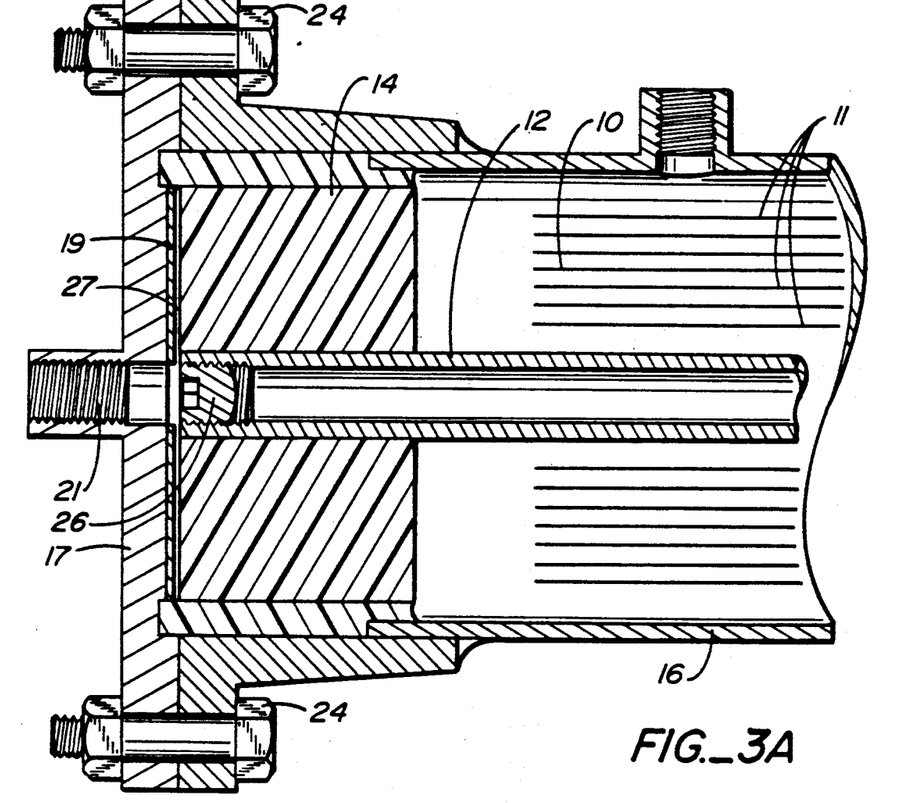
FIGS. 3A and 4A are enlarged views of two embodiments of one end of the hollow fiber membrane separation device of this invention shown in FIG. 1, showing in detail the means of bonding of the tubesheet to the inner wall surface of the surrounding case.

FIGS. 2A and 3A are enlarged views of the ends of the device of FIG. 1 illustrating the sealing means of FIG. 1.

Figure 3B:
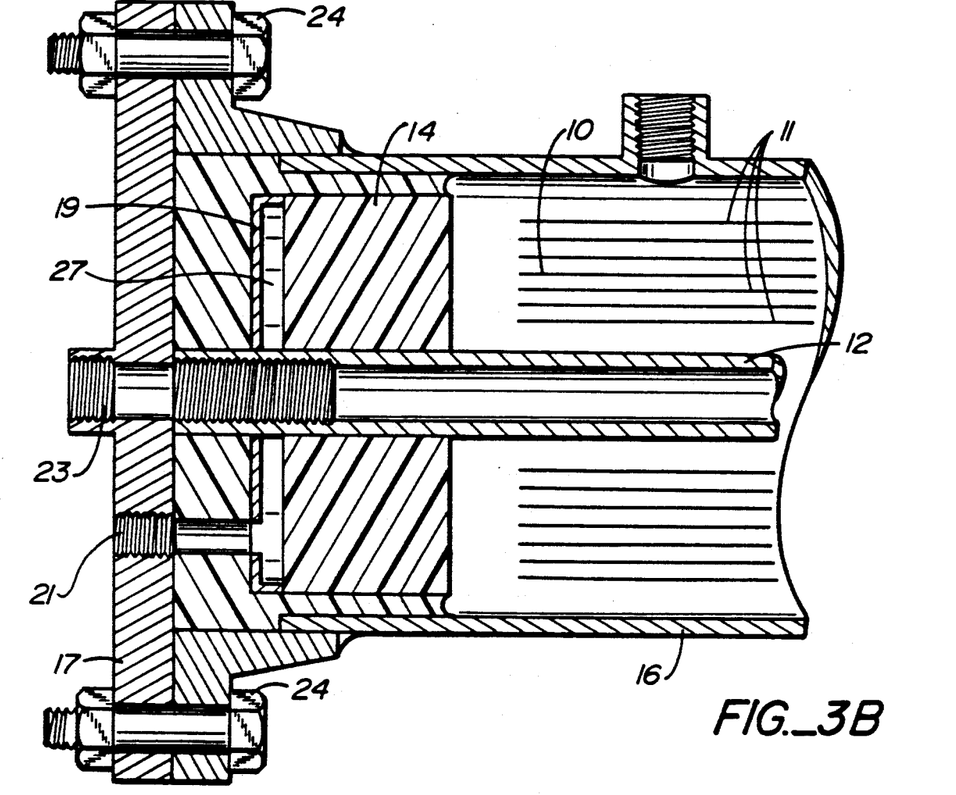
Figure 4A:
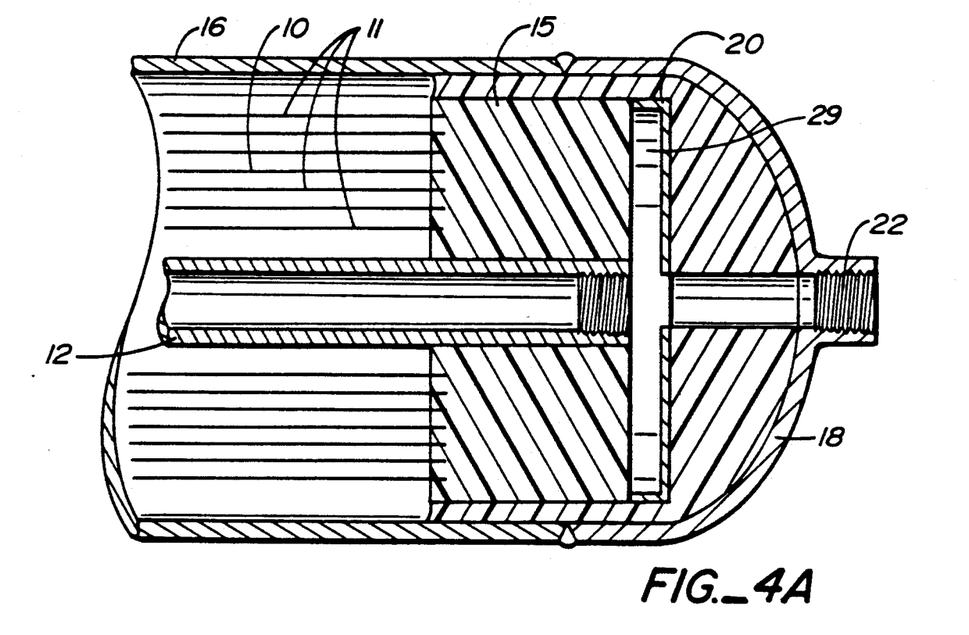
Figure 4B:
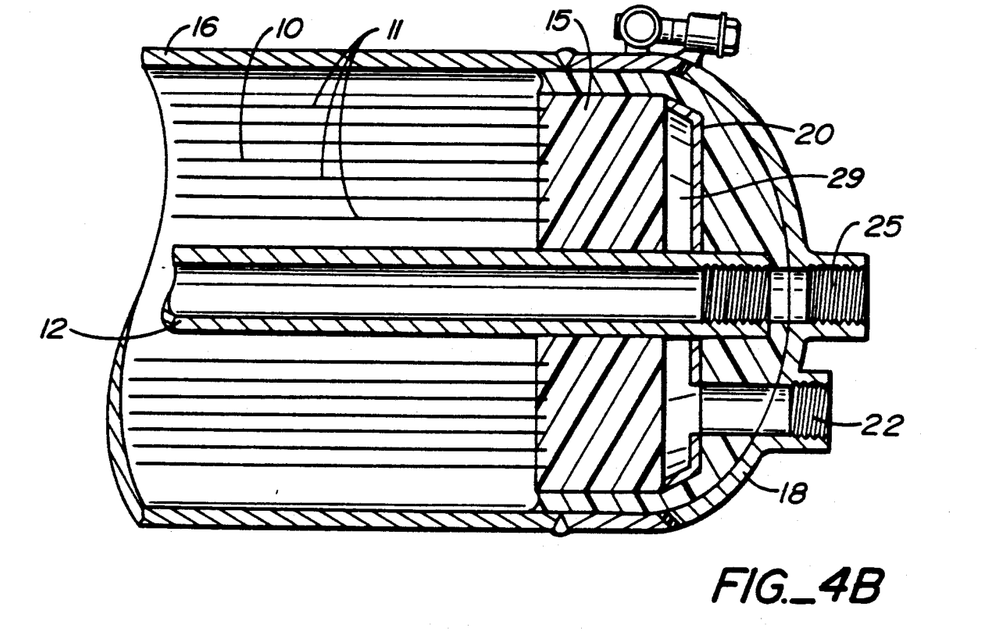

FIGS. 2B and 3B are enlarged views of the ends of a membrane device of this invention adapted for a shellside sweep fluid and possessing alternate sealing means. The sweep fluid is introduced through opening 23 and withdrawn through opening 25.

The process of this invention enables a membrane separation unit assembly to be constructed in which the membrane module is bonded to the interior wall surface of the case within which it is positioned, thereby providing a fluid-tight seal between those regions through which the fluid passes, without the possibility of intermingling of fluid between the regions.

The feed fluid may be introduced on the tubeside or shellside of the hollow fiber membrane separation device. Preferably, the feed fluid is introduced down the bores of the hollow fibers. The device unit may be operated under a variety of shellside flow configurations including co-current flow, counter-current flow, and radial flow.

In the embodiment utilizing boreside feed wherein a sweep fluid is used, the sweep fluid may be any fluid which aids in the removal of the permeate fluid from the shellside of the membrane device. The sweep fluid may be a liquid, vapor, or gas. In a gas separation or membrane stripping separation, the sweep fluid is preferably a gas. Preferred sweep gases include air, nitrogen, and the like.

The operating temperature and pressure of the device is dependent upon the type of membrane used and the membrane separation method employed. The operating temperature should be below the temperature at which the membrane integrity is adversely affected, that is, below the softening or melting point of the polymer from which the membranes are fabricated. The operating temperature preferably is less than about 95°0 C., more preferably less than about 60° C. Operating at ambient temperatures is often convenient. The operating pressure should be sufficient to pump the fluid to be treated, yet below the burst or collapse pressure of the hollow fibers, depending upon the feed mode utilized. The burst and collapse pressures are dependent on the membrane material and the fiber size. Preferably, the operating pressure is less than about 2,000 psig in the case of shellside feed and preferably less than about 100 psig in the case of boreside feed.

This invention can be more fully understood by reference to the following Example, which is intended to be illustrative of the invention, and not limiting thereof.

EXAMPLE 1

A hollow fiber membrane separation module is constructed comprising a tubular central core, surrounded by a plurality of semi-permeable hollow fibers, extruded from tetrabromobisphenol A polycarbonate in accordance with the method described in U.S. Pat. No. 4,772,392. The fibers are arranged in parallel to the central core, thus forming an elongated cylindrical device. Each end of the device is potted in an epoxy resin, to provide tubesheets which hold the hollow fibers in place. A protective tubesheet cap is positioned over the open face of each of the tubesheets at each end of the module, and the module is inserted into a tubular case which is closed at one end by an end cap. The tubular case has one port on the side thereof through which fluid may be introduced or withdrawn, and an opening at each end communicating with the region formed by the protective caps over the respective ends of the hollow fiber membrane separation device.

The case is then placed in a substantially vertical position, and resin is introduced through the opening in the bottom of the case, in an amount sufficient to fill the region between the external surface of the tubesheet not covered by the protective tubesheet cap, the protective tubesheet cap, and the inner wall of the case up to a level approximately equal to the inwardly directed face of the tubesheet. The resin is then allowed to cure.

Thereafter, the case is reversed, positioning that portion which was originally at the bottom now at the top, and repositioning that portion which originally formed the top, now at the bottom.

Thereafter, resin is introduced through the opening now positioned at the bottom of the case in an amount sufficient to fill in the available space between the external surface of the tubesheet not covered by the protective tubesheet cap, the protective tubesheet cap, and the inner wall of the case within which the membrane module is positioned, up to a level equivalent with the level of the inwardly directed face of the tubesheet. The resin is then allowed to cure.

Thereafter, the openings at each end of the membrane device through which the resin is introduced, and which now contain cured resin, are rebored to a depth whereby the protective cap overlying the open faces of the hollow fibers and the outwardly directed face of the tubesheets at each end is penetrated.

Thus, means is provided for introducing or withdrawing fluids through said respective rebored openings to that area provided by the protective covers over the faces of the tubesheets. This enables gases or liquids to be introduced into or withdrawn from the hollow fiber membranes.

What is claimed is:

1. A process for sealing a hollow fiber membrane separation module into a case in which the hollow fiber membrane separation module comprises a plurality of hollow fibers arranged in a bundle surrounding a core and having tubesheets surrounding each end of the bundle which bind the hollow fibers together, the process comprising:

A. positioning the hollow fiber separation module within a case, while the case is in a substantially vertical position;

B. providing first and second protective tubesheet caps adjacently disposed upon the tubesheets defining first and second protected and unprotected portions of the tubesheets, respectively, each protected portion and adjacently disposed protective tubesheet cap defining a space overlying the ends of the hollow fibers;

C. introducing a resin through an opening into the first end of the case in an amount sufficient to substantially fill the region defined by the first protective tubesheet cap, the first unprotected portion, and the interior of the case such that said resin encompasses a substantial portion of the first tubesheet;

D. curing the resin;

E. reversing the position of the case;

F. introducing a resin through an opening into the second end of the case in an amount sufficient to fill the regions defined by the second protective tubesheet cap, the second unprotected portion, and the interior of the case such that said resin encompasses a substantial portion o the second tubesheet;

G. curing the resin; and

H. providing openings at each end of the case through the cured resin, penetrating to the space overlying the ends of the hollow fibers, thereby providing flow paths for introducing and/or withdrawing fluids through said hollow fiber membrane separation module.

2. The process of claim 1 wherein the hollow fiber separation module comprises:

A. a plurality of hollow fiber membranes, wherein the hollow fiber membranes are arranged in a bundle and are adapted for the separation of one or more fluids from one or more other fluids in a feed fluid mixture:

B. a first tubesheet comprised of a thermoset or thermoplastic polymeric material located at the first end of the bundle, arranged such that the hollow fiber membranes are embedded in the first tubesheet and communicate through the first tubesheet and are open on the opposite face of the first tubesheet:

C. a second tubesheet comprised of a thermoset or thermoplastic polymeric material located at the second end of the bundle opposite the first end of the bundle, arranged such that the hollow fiber membranes are embedded in the second tubesheet and communicate through the second tubesheet and are open on the opposite face of the second tubesheet:

D. a core about which is arranged the hollow fiber membrane bundle, further arranged such that the core extends through and is bonded to the first tubesheet and the second tubesheet: and E. one or more means for channeling flow of fluid which permeates through the hollow fiber membranes to the region between the two tubesheets which is outside of the hollow fiber membranes, such means for channeling flow arranged to channel flow of fluid which permeates through the hollow fiber membranes in the longitudinal direction parallel to the core, wherein the means for channeling flow have one end embedded in or attached to the second tubesheet and the second end located at a distance from the first tubesheet, said distance between the second end of the means for channeling flow and the first tubesheet being sufficient to withdraw the fluid which permeates through the hollow fiber membranes and flows along the means for channeling flow.

3. The process of claim 2 wherein the hollow fiber membrane separation module further comprises:

F. a means for introducing a sweep fluid into the core, wherein the core is adapted to introduce the sweep fluid into the portion of the module between the first and second tubesheets which is outside of the hollow fiber membranes.

4. The process of claim 3 wherein the hollow fiber membrane separation module comprises an exterior means of channeling flow encircles the exterior of the hollow fiber bundle, wherein the first end of said exterior means for channeling flow is attached to or embedded in the second tubesheet, and the second end of said exterior means for channeling flow is located a distance from the first tubesheet, wherein the distance between the second end of said exterior means for channeling flow and the first tubesheet is sufficient to withdraw the permeate fluid and sweep fluid: and the module has at least one interior means for channeling flow in the interior of the hollow fiber bundle, wherein the first end of such interior means for channeling flow is located near the second tubesheet, wherein the distance between the second tubesheet and the interior means for channeling flow is sufficient to allow the sweep fluid to flow into flow channels created by the interior means for channeling flow, and the second end of the interior means for channeling flow is located near the first tubesheet, wherein the distance between the second end of the interior means for channeling flow and the first tubesheet is sufficient to withdraw the permeate fluid and sweep fluid.

5. The process of claim 2 wherein the hollow fiber membrane separation module comprises an exterior means of channeling flow encircles the exterior of the hollow fiber membrane bundle, wherein the first end of said exterior means for channeling flow is attached to or embedded in the second tubesheet, and the second end of said exterior means for channeling flow is located a distance from the first tubesheet, wherein the distance between the second end of said exterior means for channeling flow and the first tubesheet is sufficient to withdraw the permeate fluid and the device has at least one interior means for channeling flow in the interior of the hollow fiber membrane bundle, wherein the first end of such interior means for channeling flow is located near the second tubesheet, wherein the distance between the second tubesheet and the interior means for channeling flow is sufficient to allow the permeate fluid to flow into flow channels created by the interior means for channeling flow, and the second end of the interior means for channeling flow is located near the first tubesheet, wherein the distance between the second end of the interior means for and the first tubesheet is sufficient to withdraw the permeate fluid.

6. The process of claim 1 wherein the hollow fiber membranes have a dense discriminating region which separates one or more fluids from one or more other fluids.

7. The process of claim 6 wherein the hollow fiber membranes are comprised of at least one polymeric material selected from the group consisting of polysulfone, polyethersulfone, polyimide, polyestercarbonate, and polycarbonate.

8. The process of claim 7 wherein the hollow fiber membranes are comprised of at least one polymeric material selected from the group consisting of polyestercarbonate and polycarbonate.

9. The process of claim 1 wherein the membranes are microporous.

10. The process of claim 9 wherein the membranes are comprised of at least one polymeric material selected from the group consisting of polyolefins, fluorinated polyolefins, polystyrene, polyetherketone, and polyetheretherketone.

11. The process of claim 10 wherein the membranes are comprised of at least one polyolefin selected from the group consisting of polyethylene, polypropylene, and poly-4-methylpentene.

12. The process of claim 2 wherein the hollow fiber membrane separation module comprises means for channeling flows which comprise impermeable baffles which extend about 50 to about 95 percent of the bundle length between the two tubesheets.

13. The process of claim 1 wherein the hollow fiber membrane bundle is bias wrapped.

14. The process of claim 1 wherein the hollow fiber membrane bundle is parallel wrapped.

15. The process of claim 1 wherein the case comprises a pressure vessel.

16. The process of claim 1 wherein the resin comprises an epoxy resin.

17. The process of claim 1 wherein the resin comprises a polyurethane resin.

18. The process of claim 2 wherein the core is adapted to return fluid which does not permeate through the hollow fiber membranes in the vicinity of the second tubesheet to the vicinity of the first tubesheet.

* * * * *

UNITED STATES PATENT AND TRADEMARK OFFICE
CERTIFICATE OF CORRECTION

PATENT NO. : 5,059,374
DATED : October 22, 1991
INVENTOR(S) : R. T. Krueger, et al.

It is certified that error appears in the above-identified patent and that said Letters Patent is hereby corrected as shown below:

In the Abstract, line 3, "mambrane" should correctly appear as --membrane--.

Column 17, line 34, "the regions defined" should correctly appear as --the region defined--; line 37, "portion o the" should correctly appear as --portion of the--; line 51, "mixture:" should appear as --mixture;--; line 58, "sheet:" should appear as --sheet;--; and line 66, "tubesheet:" should correctly appear as --tubesheet;--.

Column 18, line 2, "tubesheet: and" should correctly appear as --tubesheet; and--; line 36, "sweep fluid:" should correctly appear as --sweep fluid;--.

Signed and Sealed this

First Day of June, 1993

Attest:

MICHAEL K. KIRK

Attesting Officer

Acting Commissioner of Patents and Trademarks